United States Patent [19]

Sommargren et al.

[11] Patent Number: 5,028,137

[45] Date of Patent: * Jul. 2, 1991

[54] ANGULAR DISPLACEMENT MEASURING INTERFEROMETER

[75] Inventors: Gary E. Sommargren, Santa Cruz, Calif.; Earl W. Ebert, Middletown, Conn.

[73] Assignee: Zygo Corporation, Middlefield, Conn.

[*] Notice: The portion of the term of this patent subsequent to Feb. 28, 2006 has been disclaimed.

[21] Appl. No.: 310,397

[22] Filed: Feb. 13, 1989

[51] Int. Cl.$^5$ ............................................. G01B 9/02
[52] U.S. Cl. ................................................... 356/363
[58] Field of Search ................................ 356/349, 363

[56] References Cited

U.S. PATENT DOCUMENTS 4,807,997  2/1989  Sommargren ................. 356/363 X

*Primary Examiner*—Davis L. Willis
*Assistant Examiner*—Matthew W. Koren
*Attorney, Agent, or Firm*—Bryan, Cave, McPheeters & McRoberts

[57] ABSTRACT

An angular displacement interferometer system capable of measuring accurately changes in angular displacement comprises a source (10) of a frequency stabilized input beam with two linear orthogonally polarized components; a tilted parallel plate or shear place (16) with regions of reflection, antireflection, and polarizing coatings for converting the input beam (12) into two separated, parallel, orthogonally polarized beams (30, 31); a half-wave retardation plate (29) located in one of the separated beams (31) for converting the two separated, parallel, orthogonally polarized beams (30, 31); into first and second beams which are spatially separated parallel, and have the same polarization (30, 33); a polarizing beamsplitter (40) and quarter-wave retardation plate (44) for transmitting the first and second beams (34, 35) to a fixed plano mirror (70) nominally perpendicular to the first and second beams for reflecting the first and second beams back into the quarter-wave retardation plate (44), polarizing beamsplitter (40), and retroreflector (48) for producing third and fourth beams (56, 67); a rotatable angle prism (72, 93) attached to the mechanical apparatus whose angular displacement is to be measured, located such that the third and fourth beams enter adjacent polygon faces of prism (72) or legs of prism (93) and are refracted to produce fifth and sixth beams which are reflected from the fixed plano mirror (70) back through the angle prism (72, 93) back through the quarter-wave retardation plate (44), beamsplitter (40), retardation plate (29) and shear plate (16) where the fifth and sixth beams are recombined into a single output beam (80) having two orthogonally polarized components in which the phase difference between the two components of the output beam (80) is related to the angular displacement; a polarizer (81) for mixing the orthogonal components of the output beam (80); a photoelectric detector (83) for producing an electrical measurement signal (85); and a phase meter/accumulator (90) for indicating the measured phase (92), the measured phase being related to the angular displacement.

13 Claims, 3 Drawing Sheets

ANGULAR DISPLACEMENT MEASURING INTERFEROMETER

CROSS-REFERENCE TO RELATION APPLICATION

This application is related to the commonly owned copending United States patent applications of Gary E. Sommargren, entitled "Angle Measuring Interferometer", bearing U.S. Ser. No. 845,926, filed Mar. 28, 1986 now U.S. Pat. No. 4,717,250; and also entitled "Angle Measuring Interferometer", bearing U.S. Ser. No. 873,420, filed June 12, 1986, now U.S. Pat. No. 4,746,216, the contents of which are specifically incorporated by reference herein, and is an improvement thereon.

BACKGROUND OF THE INVENTION

1. Field of the Invention

The present invention relates to apparatus for the measurement of changes in angular orientation. More particularly, the invention relates to optical apparatus which is useful for high accuracy angular displacement metrology using interferometry.

2. The Prior Art

High accuracy linear displacement and angular displacement measurements are required in the machine tool industry and in the semiconductor fabrication industry. Linear displacement is commonly measured with an interferometer. Angular displacements are commonly measured with either an interferometer or an autocollimator.

There are numerous interferometer configurations which can be used to measure changes in angular orientation. In conventional interferometers, changes in angular orientation between two mirrors manifests itself, in general, as a change in fringe spacing and a rotation of the fringe pattern while changes in the linear displacement between the two mirrors manifests itself as a translation of the fringes. Thusly, it takes rather complex, time consuming processing to separate these effects in order to extract the desired angular information. Also, these interferometers have a very limited angular displacement measurement range. Therefore, for for angular displacement measurements which require high accuracy and a large measurement range, these prior art interferometers are not useful.

An adaptation of a linear displacement interferometer has been used to make angular displacement measurements, see for example R. R. Baldwin, L. E. Truhe, and D. C. Woodruff, "Laser Optical Components for Machine Tool and Other Calibration," Hewlett-Packard Journal, pp. 14–16, April 1983. While this technique is useful for some applications, it is impractical to use this technique of attaching several massive retroreflectors to a rapidly rotating shaft in other applications.

Although autocollimators provide many of the desired characteristics, see for example D. Malacara, *Optical Shop Testing*, p. 467, John Wiley & Sons (1978), for high accuracy angular displacement measurements, interferometers are preferred because their measurements are based directly on a stable, fixed, built-in measurement unit, i.e., the wavelength of light, and they have a large measurement range.

Another technique, which measures the changes in angular orientation between two plane mirrors, is disclosed in the commonly owned copending U.S. Patent applications of Gary E. Sommargren, both entitled "Angle Measuring Interferometer," and bearing U.S. Ser. No. 845,926 filed Mar. 28, 1986, and Ser. No. 873,420, filed June 12, 1986, the contents of which are specifically incorporated by reference herein in their entirety. While this technique is quite useful for many applications and overcomes several disadvantages of the prior art, it may have a limited measurement range, such as e.g. $\pm\frac{1}{2}$ degree and, therefore may not be as universal as desired.

The present invention, however, retains the preferred characteristics of both the autocollimator and the interferometer over a large measurement range while avoiding the serious limitations of prior art apparatus. In the present invention, the angular displacement measurement has a large measurement range, high resolution, a high slew rate, and is insensitive to linear displacements of the rotating optical element in any of three dimensions. The measurement of the present invention is also interferometric so that it is based on the wavelength of light. The improvements of the present invention thusly overcome the disadvantages of the prior art and allow the high accuracy, i.e., to a small fraction of an arc second, angular displacement measurement required for precision, high speed optical scanners within a large measurement range.

SUMMARY OF THE INVENTION

In accordance with the instant invention, we provide an angular displacement interferometer system capable of measuring accurately changes in angular displacement comprising: (1) a source of a frequency stabilized input beam with two linear orthogonally polarized components which may or may not be of the same frequency; (2) means, most preferably a tilted parallel plate or shear plate with regions of reflection, antireflection, and polarizing coatings, for converting the input beam into two separated, parallel, orthogonally polarized beams; (3) means, most preferably a half-wave retardation plate, located in one of said separated beams, for converting the two separated, parallel, orthogonally polarized beams into first and second beams which are spatially separated, parallel, and have the same polarization; (4) means, most preferably a polarizing beamsplitter and quarter-wave retardation plate, for transmitting the first and second beams to; (5) means, most preferably a fixed plano mirror nominally perpendicular to the first and second beams for reflecting the first and second beams back into (6) means, most preferably the quarter-wave retardation plate, polarizing beamsplitter, and retroreflector, for producing third and fourth beams; (7) means, most preferably a glass element with plane parallel faces hereafter referred to as the angle prism, attached to the mechanical apparatus whose angular displacement is to be measured; (8) means, most preferably a polarizer, for mixing the orthogonal components of the output beam; (9) means, most preferably a photoelectric detector for producing an electrical measurement signal; and (10) means, most preferably a phase meter/accumulator, for indicating the measured phase, the measured phase being related to the angular displacement.

Embodiment 1 has an angle prism (shown in FIG. 3a) located such that the third and fourth beams enter adjacent faces and are refracted and propogate to the fixed plano mirror. The third and fourth beams are reflected from the fixed plano mirror reflecting means back along the same path through the angle prism and back through the quarter-wave retardation plate, polarizing beamsplitter, with one beam passing through the half-wave retardation plate, and both through the tilted parallel or shear plate where the third and fourth beams are recombined into a single output beam having two orthogonally polarized components in which the phase difference between the two components of the output beam is related to said angular displacements.

Embodiment 2 as shown in FIG. 2 utilizes an optical system identical to embodiment 1 to creat first, second, third and fourth beams. The forms of the angle prism are different than embodiment 1.

THE DRAWINGS

Figure 3A:
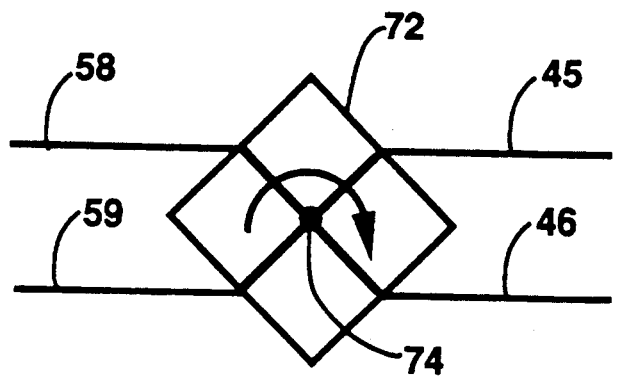
Figure 3B:
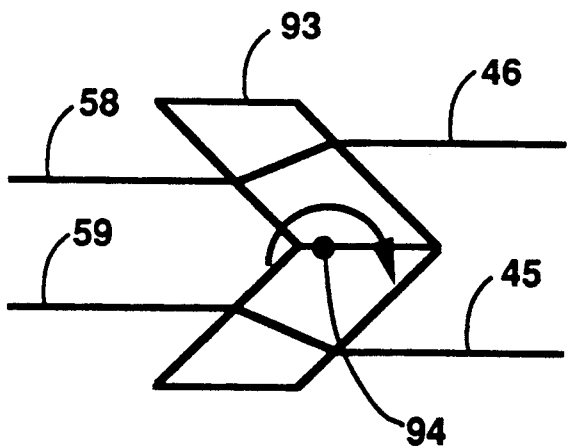

FIGS. 3a and 3b depict in schematic form the optical ray paths through the angle prisms of embodiments 1 and 2 respectively.

DETAILED DESCRIPTION OF THE INVENTION

The detailed description of the invention will relate to the function of embodiment 1. The function of embodiment 2 is similar and will be described as exceptions to embodiment 1.

Figure 1:
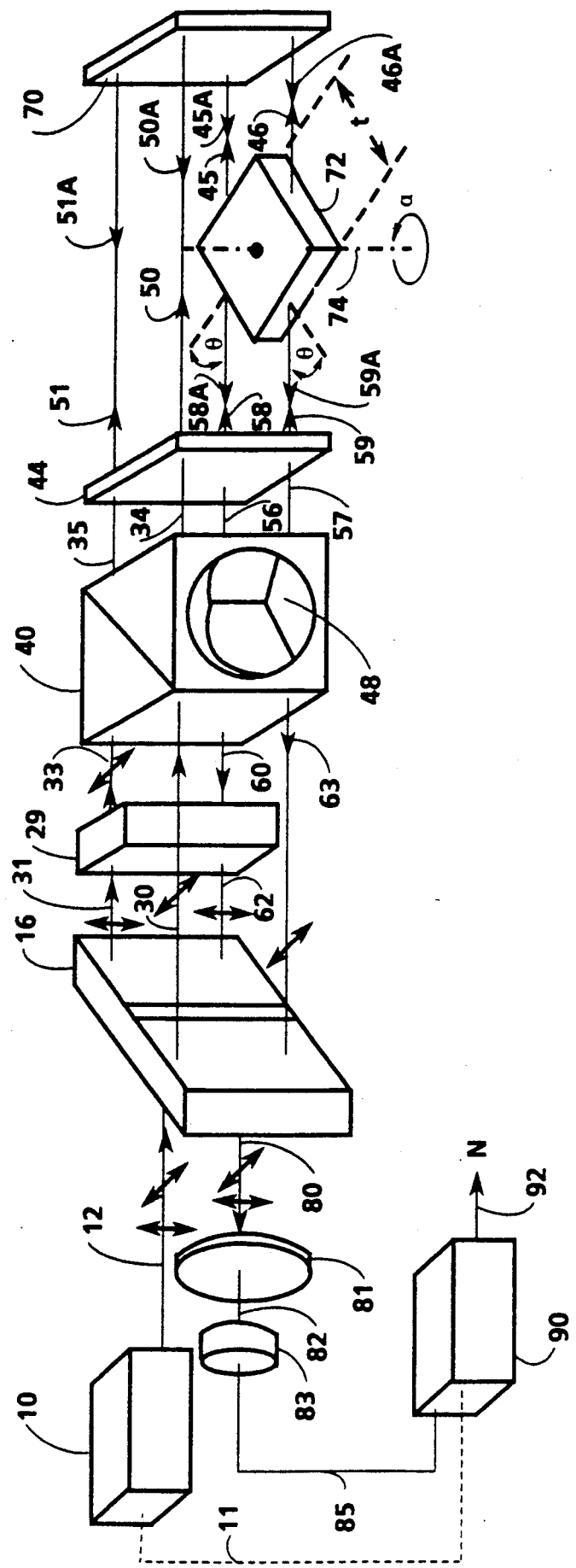
FIG. 1 depicts in schematic form embodiment 1 of the instant invention.

FIG. 1 depicts in schematic form embodiment 1 of the instant invention. While the apparatus has application for a wide range of radiation sources, the following description is taken by way of example with respect to an optical measuring system. Light source (10), which most preferably uses a laser, emits input beam (12) which is frequency stabilized and comprised of two linear orthogonally polarized components as indicated by the two arrows on beam (12), which may, or may not, be of the same optical frequency. If the frequencies are the same, see for example Downs, et al. U.S. Pat. No. 4,360,271, issued Nov. 23, 1982. If the frequencies are different, see for example, Bagley, et al. U.S. Pat. No. 3,458,259 issued July 26, 1969 and commonly owned U.S. Pat. No. 4,688,940 issued Aug. 25, 1987, in which instance source (10) would provide an electrical reference signal (11), shown by the dotted lines in FIG. 1, which would correspond to the frequency difference between the two stabilized frequencies. It should be noted that no such reference signal (11) is provided when the two orthogonally polarized components comprising input beam (12) are of the same frequency.

Beam (12) is incident on shear plate (16) which is a tilted glass substrate with optically flat surfaces which are mutually parallel. The function of tilted parallel plate (16) is to spatially separate the two polarization components using conventional polarization techniques as described in commonly-owned U.S. Pat. No. 4,693,605 issued Sept. 15, 1987. Thus, in the embodiment of FIG. 1, beam (12) is divided by tilted parallel plate (16), with the aid of antireflection coatings, a polarizing coating, and a reflective coating, to become vertically polarized beam (31) and horizontally polarized beam (30). Beam (31) passes through a single half-wave retardation plate (29) which rotates the linear polarization of beam (31) by 90° so that resultant beam (33) has the same polarization as beam (30). Beams (30) and (33) enter polarizing beamsplitter (40) and are transmitted as beams (34) and (35) respectively. Beams (34) and (35) pass through quarter-wave retardation plate (44) and are converted into circularly polarized beams (50) and (51), respectively. Beams (50) and (51) are reflected from a fixed plano mirror (70) to become beams (50A) and (51A). Beams (50A) and (51A) pass back through the quarter-wave retardation plate (44) and are converted back into linearly polarized beams that are orthogonally polarized to the original incident beams (34) and (35). Beams (50A) and (51A) are reflected by the polarizing beamsplitter (40), retroreflector (48), and polarizing beamsplitter (40) a second time to become beams (56) and (57), respectively. Beams (56) and (57) pass through the quarter-wave retardation plate (44) and are converted into circularly polarized beams (58) and (59), respectively. The tilted shear plate (16), half-wave retardation plate (29), polarizing beamsplitter (40), retroreflector (48), and quarter-wave retardation plate (44) preferably function in the manner described in detail in commonly-owned U.S. Pat. No. 4,693,605 issued Sept. 15, 1987, the contents of which are specifically incorporated by reference herein. Beams (58) and (59) are preferably incident on the adjacent polygon faces of an angle prism (72). The angle prism (72) for embodiment of FIG. 1 is preferably a solid glass element of refractive index, n, whose opposite polygon faces are parallel. The spacing between the two pairs of opposite polygon faces is equal and denoted by t. The angle prism (72) is preferably mounted on the mechanical apparatus (not shown) whose angular displacement, α, about rotation axis (74) is to be measured. The initial angle of incidence of beams (58) and (59) on the corresponding polygon faces of the angle prism (72) is denoted by θ.

Beam (59) is refracted by the angle prism (72) as beam (45) which is displaced from and parallel to beam (59). Beam (58) is refracted by the angle prism (72) as beam (46) which is displaced from and parallel to beam (58). Beams (45) and (46) are reflected from the fixed plano mirror (70) as beams (45A) and (46A), respectively. Beams (45A) and (46A) are incident on the angle prism (72) and are refracted as beams (59A) and (58A), respectively. Beams (58A) and (59A) pass back through the quarter-wave retardation plate (44) and are converted back into linearly polarized beams that are polarized the same as the original incident beams (34) and (35). Beams (58A) and (59A) are transmitted by and leave the polarizing beamsplitter (40) as beams (60) and (63), respectively. Beams (60) and (63) are mutually parallel by virtue of the inherent optical properties of the retroreflector (48) and the angle prism (72). Beam (60) passes through the half-wave retardation plate (29) which rotates the linear polarization of beam (60) by 90° so that resultant beam (62) has a linear polarization which is orthogonal to beam (63). Beams (62) and (63) are combined by the shear plate (16), with the aid of an antireflection coating, a polarizing coating, and a reflective coating, each becoming one linearly polarized component of beam (80). For the initial position of the angle prism (72), each component of beam (80) has transversed exactly the same optical path length through air and glass. When the angle prism (72) is angularly displaced about the rotation axis (74) of the mechanical apparatus on which it is mounted, an optical path difference is introduced between the two polarization components of beam (80). This optical path difference, OPD, is expressed as $$OPD = t[\sqrt{n^2 - \sin^2(\theta + \alpha)} - \sqrt{n^2 - \sin^2(\theta - \alpha)} + 2\sin\alpha\sin\theta], \quad (1)$$

where t, n, θ and α have been previously defined. This optical path difference results in a phase difference between the two polarization components of beam (80). This phase difference is measured by passing beam (80) through polarizer (81), oriented at 45° to each polarization component, which mixes the two orthogonally polarized components in beam (80) to give beam (82). The interference between the two polarization components is detected by a photodetector (83) producing electrical signal (85). Electronic module or phase meter/accumulator (90) extracts the phase variation from electrical signal (85). When the two polarization components of beam (12) are of the same optical frequency, module (90) does not require reference signal (11), since there is no corresponding frequency difference, and conventionally extracts the phase variation from signal (85) such as in the manner described in aforementioned U.S. Pat. No. 4,360,271. However, when the two polarization components of beam (12) are of different frequencies, an additional sinusoidal electrical reference signal (11) equal in frequency to the difference between the two optical frequencies is required by electronic module (90), which reference signal (11), as previously mentioned, would be provided from source (10) in which instance photo detector (83) would detect the interference between the two frequency components as a sinusoidal intensity variation with a frequency approximately equal to the difference frequency between the two components of beam (12), and module (90) would preferably comprise a phase meter/accumulator such as described in the aforementioned U.S. Pat. No. 4,688,940, the contents of which are incorporated by reference herein. In either event, electronic module (90) provides output (92) which is directly proportional to the optical path difference given in the above equation.

The output (92) of module (90) is usually in terms of counts, N, which is related to the angular orientation of the angle prism (72) by $$N = (M/\lambda)(OPD) \quad (2)$$

$$N = (Mt/\lambda)[\sqrt{n^2 - \sin^2(\theta + \alpha)} - \sqrt{n^2 - \sin^2(\theta - \alpha)} + 2\sin\alpha\sin\theta] \quad (3)$$

where λ is the wavelength of beam (12) and M is an integer which characterizes the degree to which module (90) can sub-divide the wavelength λ. Since M, t, λ and n are constants, the above equation expresses the number of counts, N, for an angular displacement, α. Although this relationship is quite linear over the range $-20° \leq \alpha \leq 20°$, the highest precision is achieved by generating a look-up table for α vs. N. For nominal values of M, t, λ, θ, and n, the angular resolution of this angular displacement measuring interferometer is approximately 0.03 arc-second. In addition it is insensitive to linear displacement of the angle prism (72) in any of three dimensions as well as rotation about the other two axes. It should be noted that the angle prism (72) can be placed not only in beams (58) and (59) but also in beams (50) and (51), beams (51) and (58), or beams (50) and (59) with the instant invention functioning as disclosed.

Figure 2:
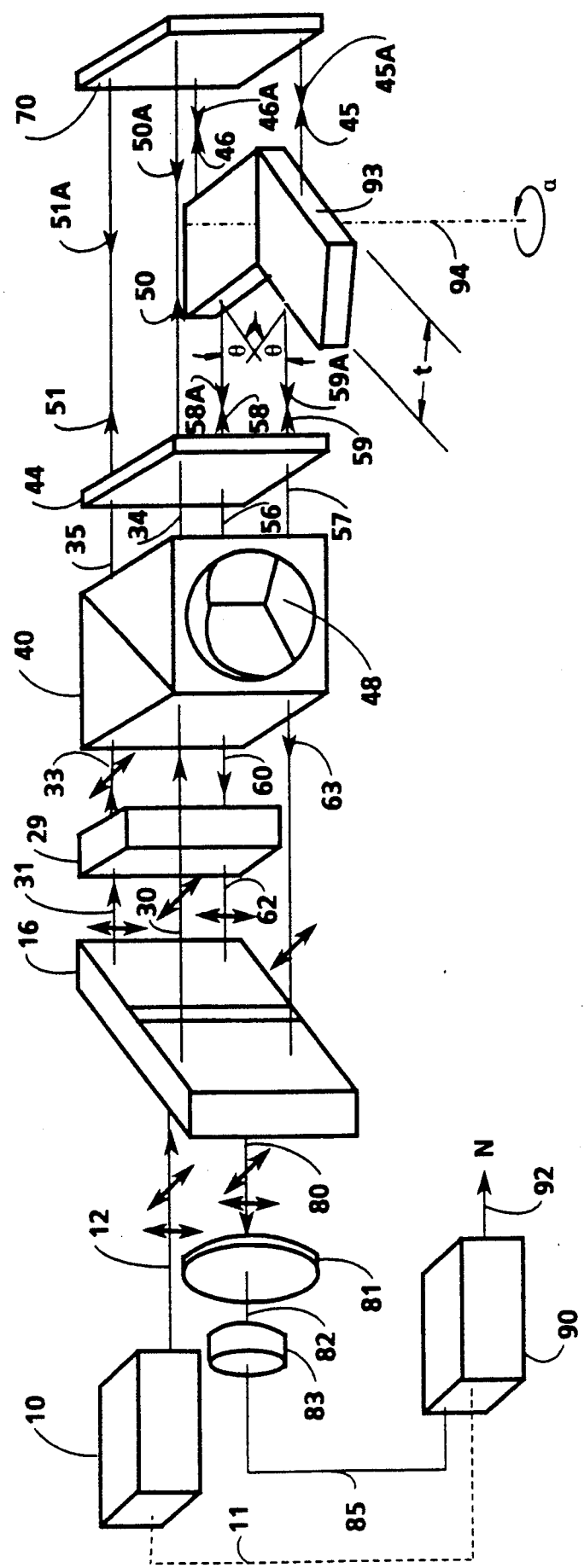
FIG. 2 depicts in schematic form embodiment 2 of the instant invention.

FIG. 2 depicts in schematic form a second embodiment, embodiment 2, of the instant invention. Embodiment 2 is preferably identical in all respects to embodiment 1 except for the form of the angle prism (93). The angle prism (93) in embodiment 2 is most preferably an assembly of two polished plane parallel plates of glass as shown in FIG. 3b. The plates may be cemented together or held by the mechanical means. FIG. 3b also shows the optical ray paths through embodiment 2's angle prism. Note that unlike the prism (72) in embodiment 1, the optical rays refract away from one another. This feature allows the embodiment 2 angle prism (93) to rotate farther than the embodiment 1 angle prism (72) before the optical rays are clipped by the apex of the prism closest to the test mirror (70). It is preferable for the angle prism (93) to rotate about its center of mass. The location of the center of mass for the embodiment 2 prism (93) is determined by its thickness, apex angle and length of the legs. Typically, the center of mass is located close to the apex closest to the beamsplitter cube (40).

The principal advantages of the instant invention are (1) relatively large measurement range, i.e. ±20°, (2) high resolution, i.e. 0.03 arc second, (3) insensitive to changes in the five other degrees of freedom of the angle prism, (4) the measurement is based on the wavelength of light, and (5) it can measure angular displacements with high angular slew rates, e.g. 100 radians/sec.

While a preferred embodiment of the invention has been disclosed, obviously modification can be made therein, without departing from the scope of the invention as defined in the following claims.

What is claimed is:

1. An angular displacement interferometer system for accurately measuring changes in angular displacement of a mechanical apparatus, said system comprosing a source of a frequency stabilized input beam with two linear orthogonally polarized components; means for converting said input beam into two separated, parallel, orthogonally polarized beams; means located in one of said separated beams for converting said two separated, parallel, orthogonally polarized beams into first and second beams which are spatially separated, parallel, and have the same polarization; means for transmitting said first and second beams; means disposed in the path of said transmitted beams for reflecting said first and second transmitted beams; means disposed in the path of said reflected beams for producing third and fourth beams; rotatable angle prism means including a solid glass element of refractive index in whose opposite polygon sides are parallel attached to said mechanical apparatus located such that said third and fourth beams enter adjacent faces and are refracted and propagate to said reflecting means to produce fifth and sixth beams which are reflected from said reflecting means back through said rotatable angle prism means attached to said mechanical apparatus and back through said means for producing said third and fourth beams, said means for converting said two separated beams into said first and second beams having the same polarization and said means for converting said input beams into said two orthogonally polarized beams wherein said fifth and sixth beams are recombined into a single output beams having two orthogonally polarized components in which the phase difference between the two components of said output beam is related to said angular displacement, said rotatable angle prism being rotatable about a rotation axis of said mechanical apparatus on which it is mounted through an angle in accordance with said angular displacement of said mechanical apparatus; means for mixing said orthogonal components of said output beams; means for producing an electrical measurement signal; and means for indicating a measured phase, said measured phase being related to said angular displacement.

2. A system in accordance with claim 1 wherein said rotatable angle prism comprises two pairs of opposite polygon faces having a spacing t therebetween which is equal.

3. A system in accordance with claim 2 wherein said third and fourth beams are incident on the adjacent polygon faces of said rotatable angle prism, said third and fourth beams having an initial angle of incidence $\theta$ on said corresponding polygon faces of said rotatable angle prism.

4. A system in accordance with claim 3 wherein when said rotatable angle prism is angularly displaced about said rotation axis, an optical path difference OPD is introduced between said orthogonal components of said output beam defined by the expression $$OPD = t[\sqrt{n^2 - \sin^2(\theta + \alpha)} - \sqrt{n^2 - \sin^2(\theta - \alpha)} + 2\sin\alpha\sin\theta].$$

5. A system in accordance with claim 4 wherein said means for indicating said measured phase comprises means for indicating said measured phase in terms of counts N related to said angular orientation of said rotatable angle prism by the expression $$N = (M/\lambda)(OPD)$$

and $$N = (Mt/\lambda)[\sqrt{n^2 - \sin^2(\theta + \alpha)} - \sqrt{n^2 - \sin^2(\theta - \alpha)} + 2\sin\alpha\sin\theta]$$

where $\lambda$ is the wavelength of said input beam and M is an integer which characterizes the degree to which said means for indicating said measured phase can sub-divide said wavelength $\lambda$.

6. A system in accordance with claim 1 wherein said rotatable angle prism means comprises an assembly of two polished plane parallel plates of glass defining two legs.

7. A system in accordance with claim 6 wherein said third and fourth beams entering said rotatable angle prism are refracted away from each other to produce said fifth and sixth beams.

8. A system in accordance with claim 7 wherein said rotatable angle prism is rotatable about its center of mass on said rotation axis.

9. A system in accordance with claim 8 wherein the location of said center of mass is determined by said rotatable prism thickness, apex angle and length of said legs.

10. A system in accordance with claim 9 wherein said transmitting means comprises a polarizing beamsplitter, said center of mass being located close to the apex closest to said polarizing beamsplitter.

11. A system in accordance with claim 6 wherein said rotatable angle prism is rotatable about its center of mass on said rotation axis.

12. A system in accordance with claim 11 wherein the location of said center of mass is determined by said rotatable prism thickness, apex angle and length of said legs.

13. A system in accordance with claim 12 wherein said transmitting means comprises a polarizing beamsplitter, said center of mass being located close to the apex closest to said polarizing beamsplitter.

* * * * *

UNITED STATES PATENT AND TRADEMARK OFFICE
CERTIFICATE OF CORRECTION

PATENT NO. : 5,028,137
DATED : July 2, 1991
INVENTOR(S) : Gary E. Sommargren et al.

It is certified that error appears in the above-identified patent and that said Letters Patent is hereby corrected as shown below:

Column 1, line 11:   Change "1986now" to --1986, now--.

Column 1, line 44:   Delete the second occurrence of "for".

Column 3, line 10:   Change "creat" to --create--.

In the claims,

Column 6, line 39:   In claim 1, change "comprosing" to --comprising--.

Signed and Sealed this

Second Day of February, 1993

Attest:

STEPHEN G. KUNIN

Attesting Officer     Acting Commissioner of Patents and Trademarks